US011915859B2

(12) United States Patent
Han et al.

(10) Patent No.: US 11,915,859 B2
(45) Date of Patent: Feb. 27, 2024

(54) CORE FOR CURRENT TRANSFORMER

(71) Applicant: AMOSENSE CO., LTD, Cheonan-si (KR)

(72) Inventors: Cheol-Seung Han, Seoul (KR); Won-San Na, Seoul (KR); Jin-Pyo Park, Seoul (KR); Young-Joon Kim, Gimpo-si (KR); Jae-Jun Ko, Seoul (KR)

(73) Assignee: AMOSENSE CO., LTD, Cheonan-si (KR)

( * ) Notice: Subject to any disclaimer, the term of this patent is extended or adjusted under 35 U.S.C. 154(b) by 1405 days.

(21) Appl. No.: 16/322,663

(22) PCT Filed: Aug. 4, 2017

(86) PCT No.: PCT/KR2017/008443

§ 371 (c)(1),
(2) Date: Feb. 1, 2019

(87) PCT Pub. No.: WO2018/026234

PCT Pub. Date: Feb. 8, 2018

(65) Prior Publication Data

US 2019/0180932 A1 Jun. 13, 2019

(51) Int. Cl.

*H01F 38/28* (2006.01)
*H01F 38/30* (2006.01)

(Continued)

(52) U.S. Cl.

CPC ............... *H01F 38/30* (2013.01); *H01F 3/10* (2013.01); *H01F 27/24* (2013.01); *H01F 41/0246* (2013.01)

(58) Field of Classification Search

CPC . H01F 38/30; H01F 3/10; H01F 27/24; H01F 38/28; H01F 2038/305; H01F 38/32; H01F 27/427

See application file for complete search history.

(56) References Cited

U.S. PATENT DOCUMENTS 3,546,565 A * 12/1970 Koll ........................ H01F 38/28
323/309
4,851,803 A * 7/1989 Hahn .................... H01F 27/266
336/212

(Continued)

FOREIGN PATENT DOCUMENTS

CN 203150375 U 8/2013
JP 2004022847 A * 1/2004

*Primary Examiner* — Mang Tin Bik Lian
(74) *Attorney, Agent, or Firm* — CL Intellectual LLC

(57) ABSTRACT

Disclosed is a core for a current transformer, which forms an upper core in a round shape, and is disposed at a position lower than the center of a power line having both ends of the upper core received, thereby minimizing the stress of a magnetic path, and increases the permeability, thereby enhancing the magnetic induction efficiency. The disclosed core for the current transformer includes an upper core curved in a semi-circular shape to have a receiving groove formed therein, and having both ends extended downwards to be disposed to be spaced apart from each other and a lower core disposed on the lower portion of the upper core, and having both ends extended upwards to be disposed to face both ends of the upper core.

9 Claims, 14 Drawing Sheets

(51) Int. Cl.

| | |
|---|---|
| ***H01F 3/10*** | (2006.01) |
| ***H01F 27/24*** | (2006.01) |
| ***H01F 41/02*** | (2006.01) |

(56) References Cited

U.S. PATENT DOCUMENTS

| | | | | |
|---|---|---|---|---|
| 5,418,514 | A * | 5/1995 | Smith | H01F 38/30<br>336/221 |
| 9,134,344 | B2 * | 9/2015 | Harlev | G01R 19/0092 |
| 2007/0285201 | A1 * | 12/2007 | Zumoto | G01R 1/22<br>336/107 |
| 2009/0115403 | A1 * | 5/2009 | Bernklau | H01F 38/30<br>336/176 |
| 2011/0279207 | A1 * | 11/2011 | Patel | H01F 27/06<br>336/65 |
| 2013/0200971 | A1 * | 8/2013 | Crutcher | H01F 27/24<br>29/602.1 |
| 2014/0176164 | A1 * | 6/2014 | Davis | G01R 19/0084<br>324/709 |
| 2014/0300341 | A1 * | 10/2014 | Davis | G01R 15/142<br>324/97 |
| 2015/0054609 | A1 * | 2/2015 | Cook | H01F 38/30<br>336/132 |

* cited by examiner

[FIG. 1]
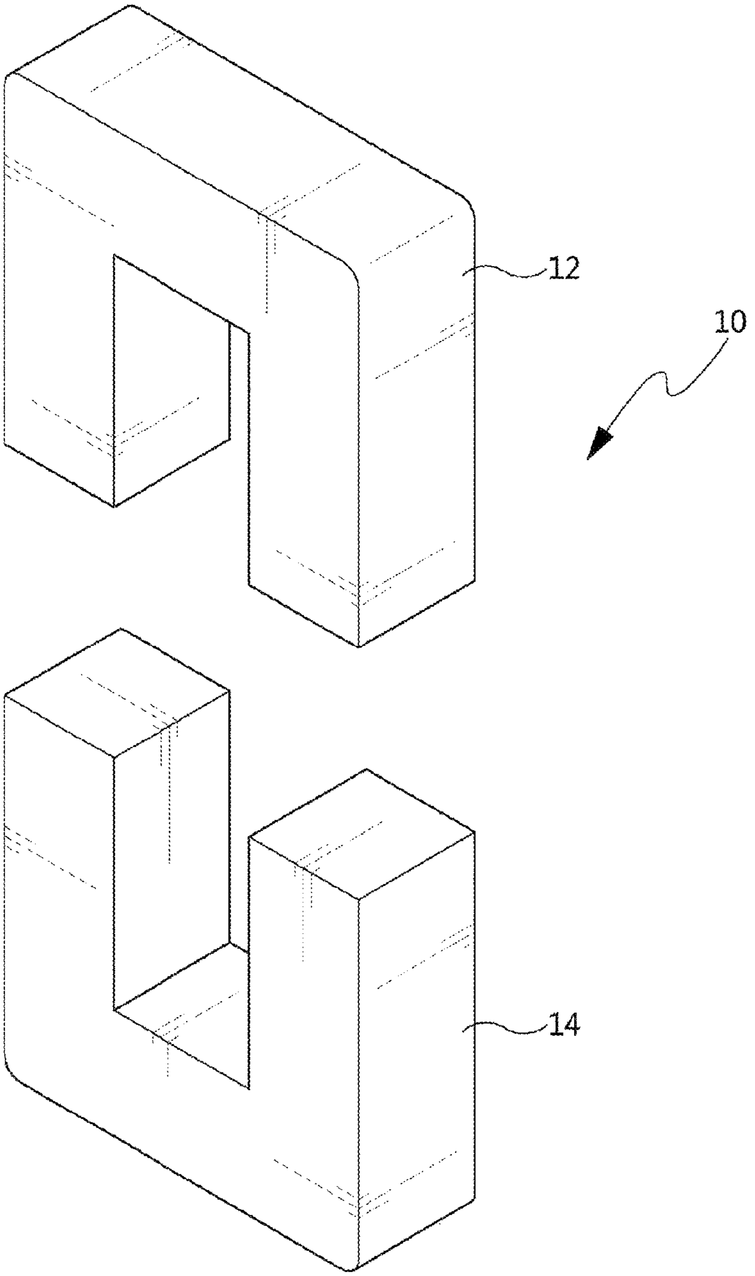
PRIOR ART

[FIG. 2]
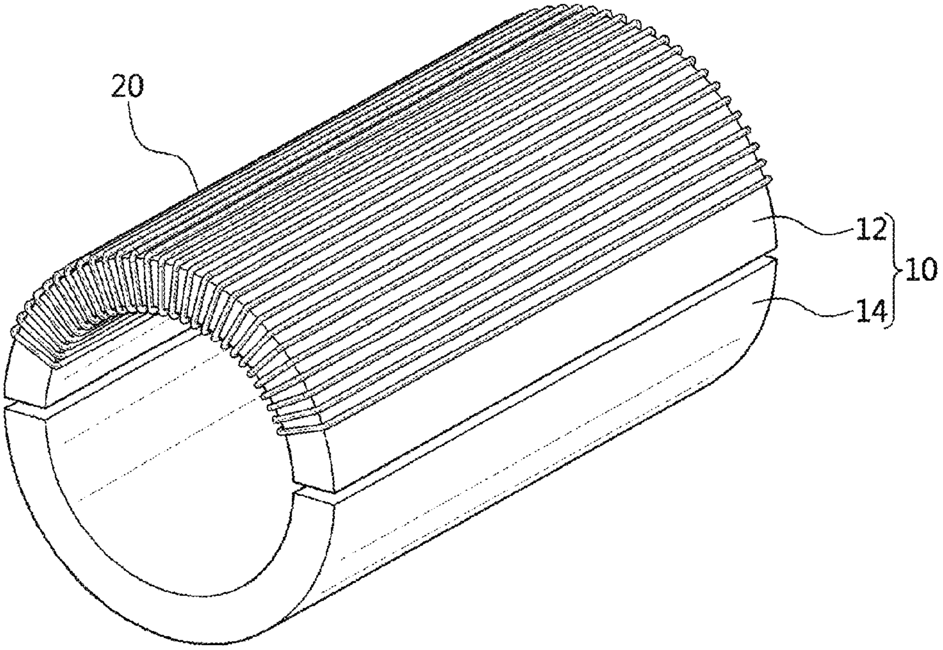
PRIOR ART

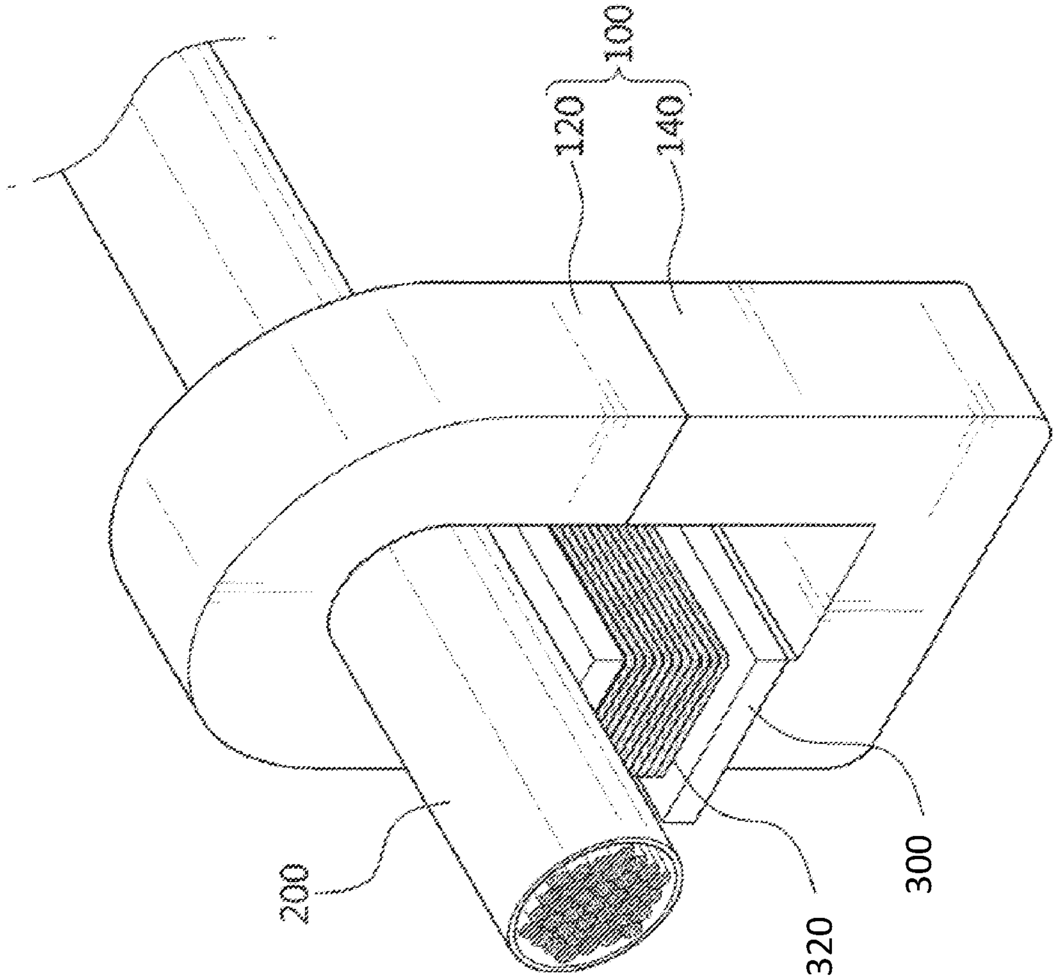
[FIG. 3]

[FIG. 4]
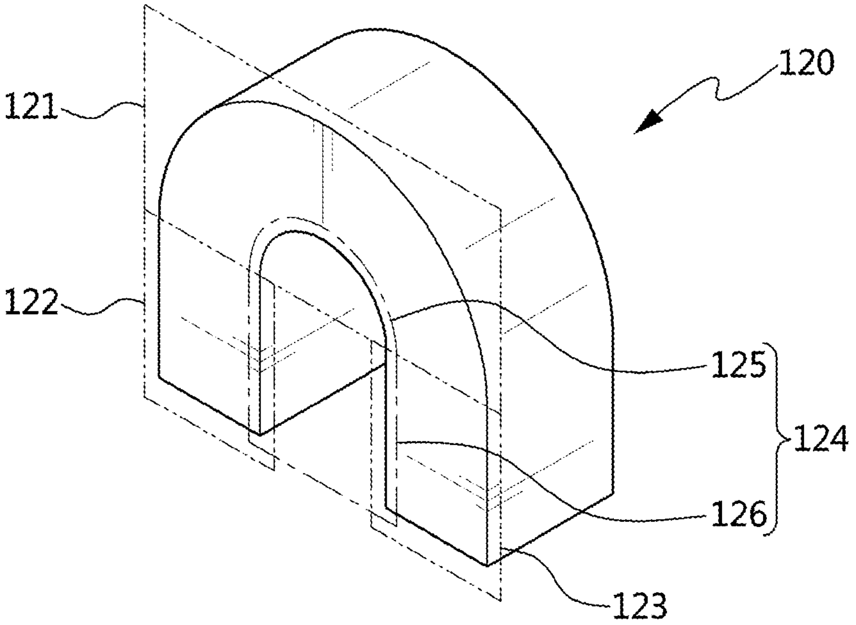
[FIG. 5]
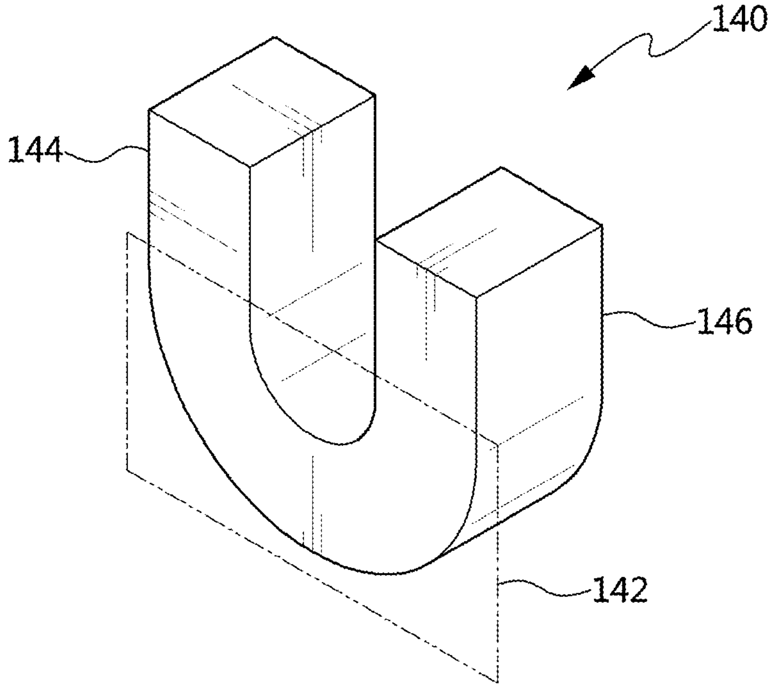

[FIG. 6]
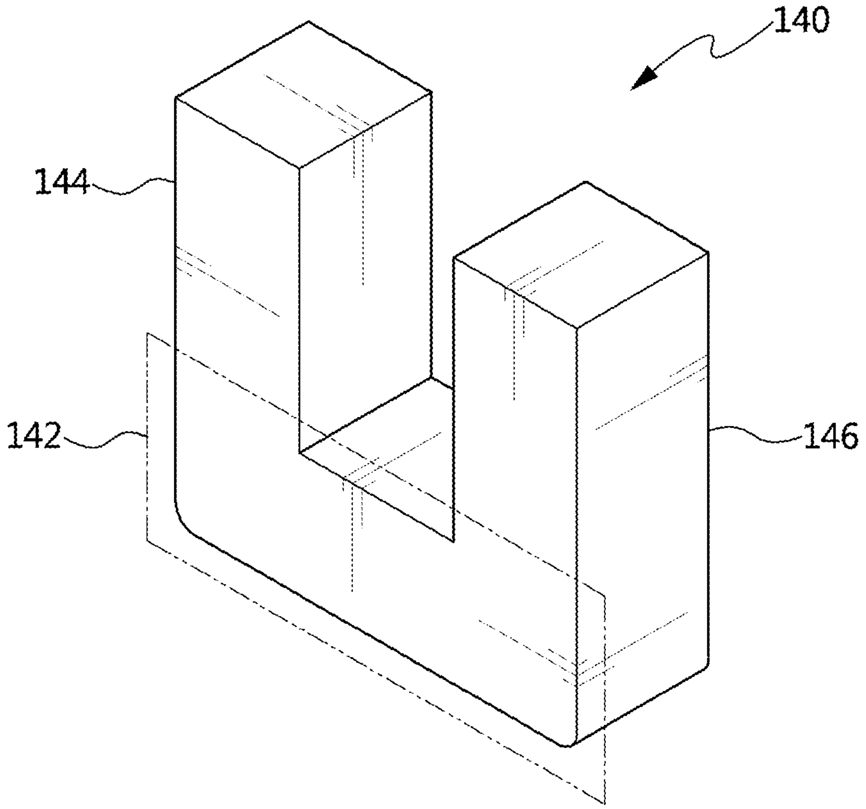

[FIG. 7]
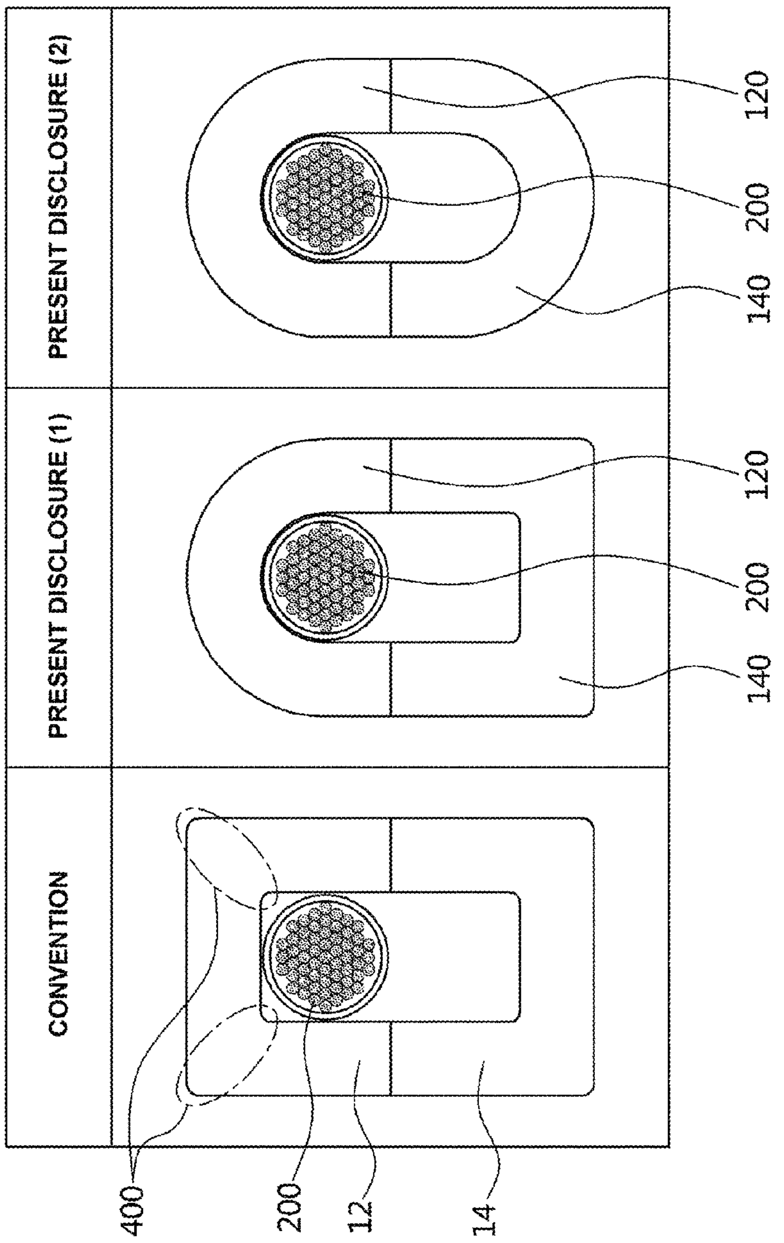

[FIG. 8]
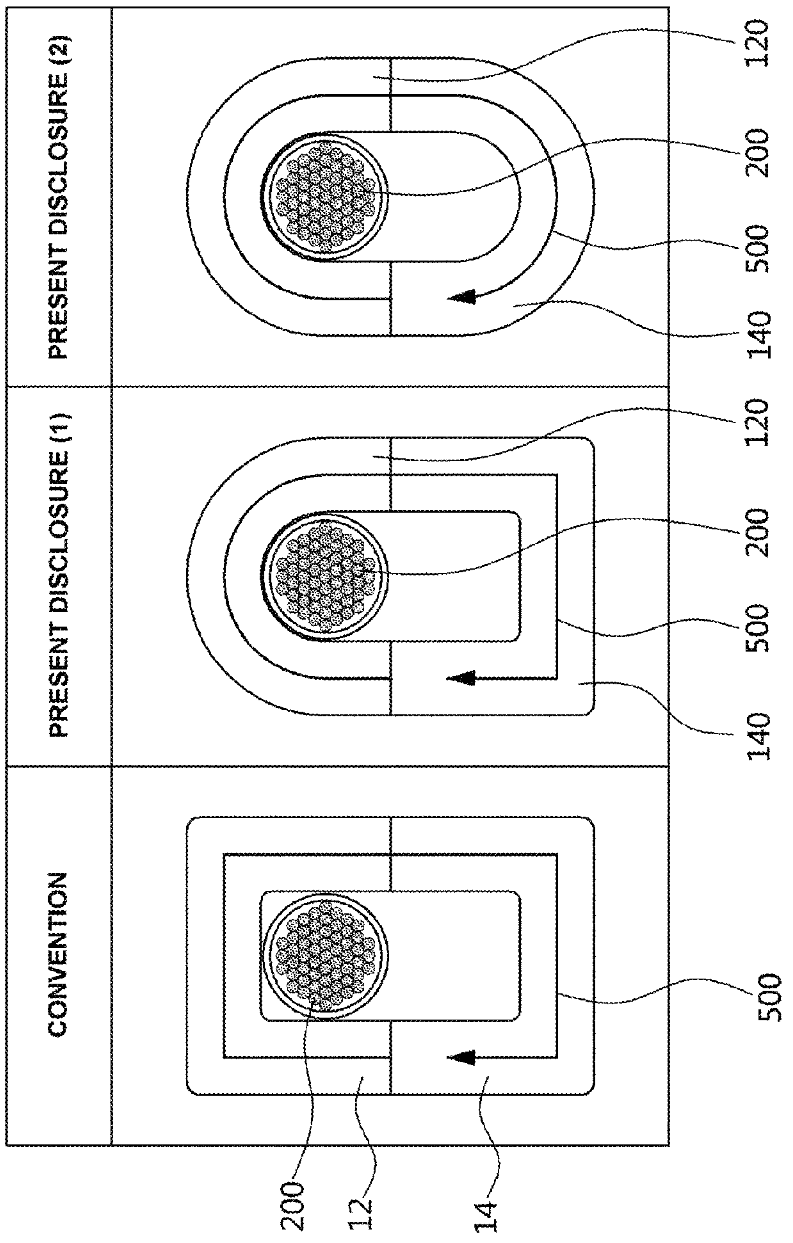

[FIG. 9]
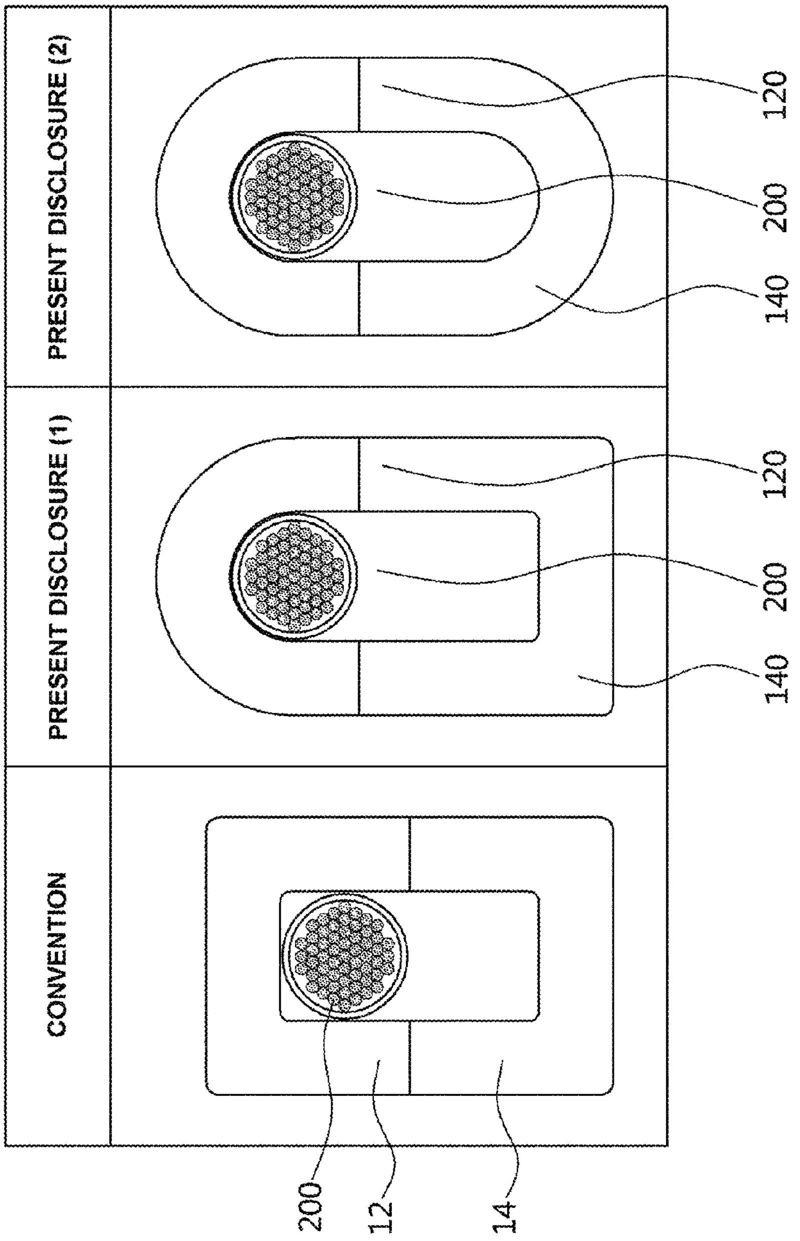

[FIG. 10]
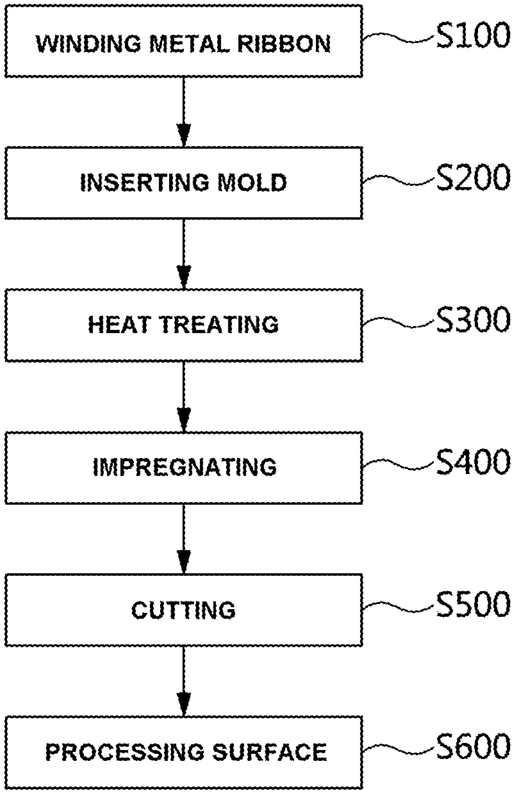

[FIG. 11]
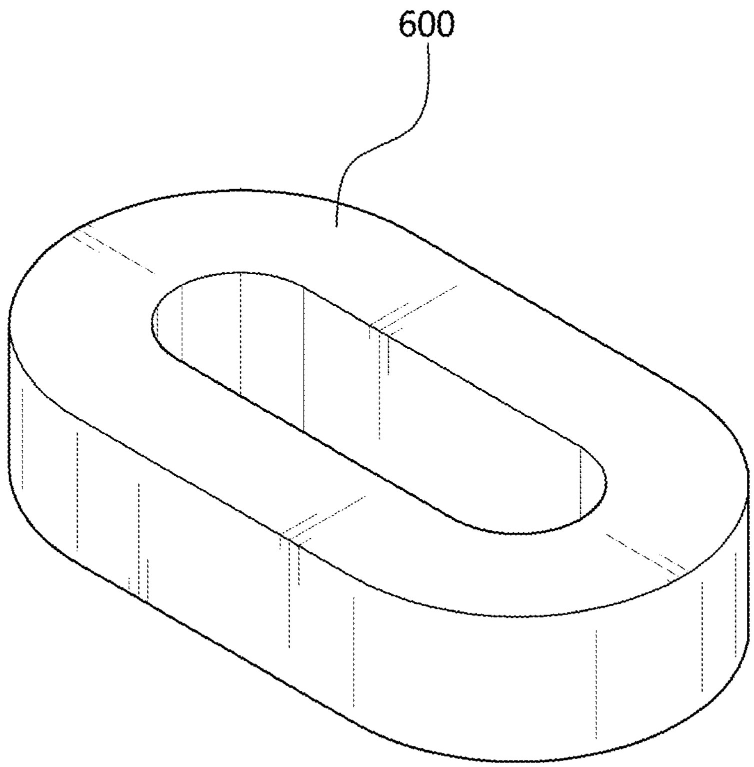

[FIG. 12]
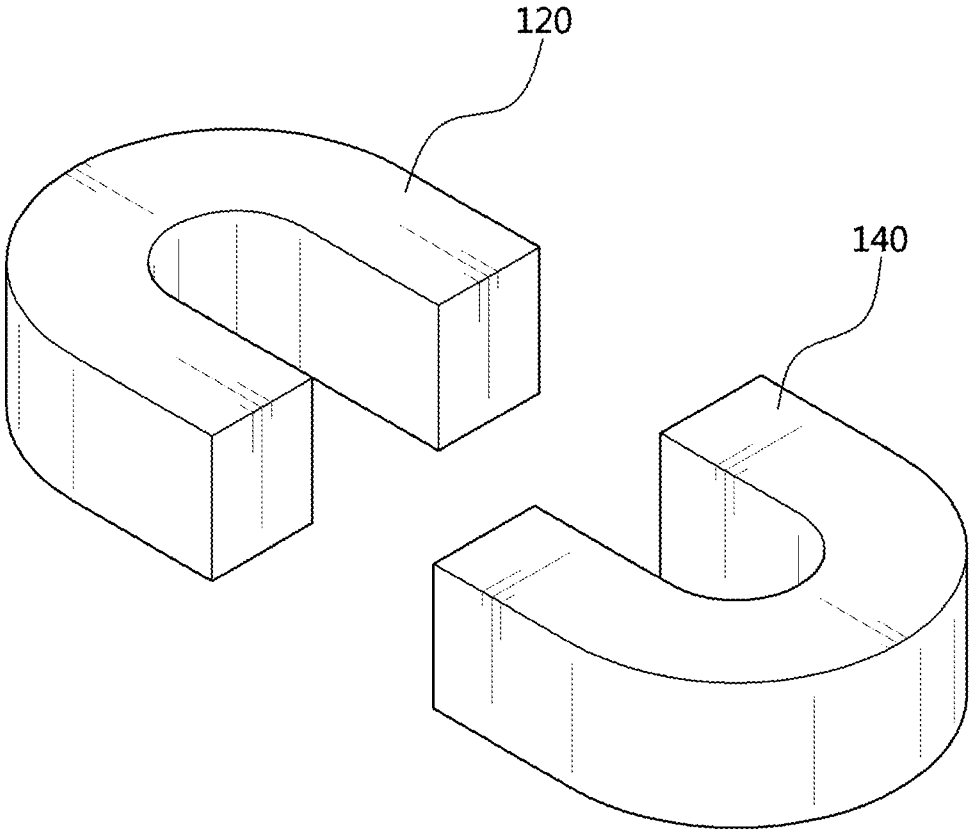

[FIG. 13]
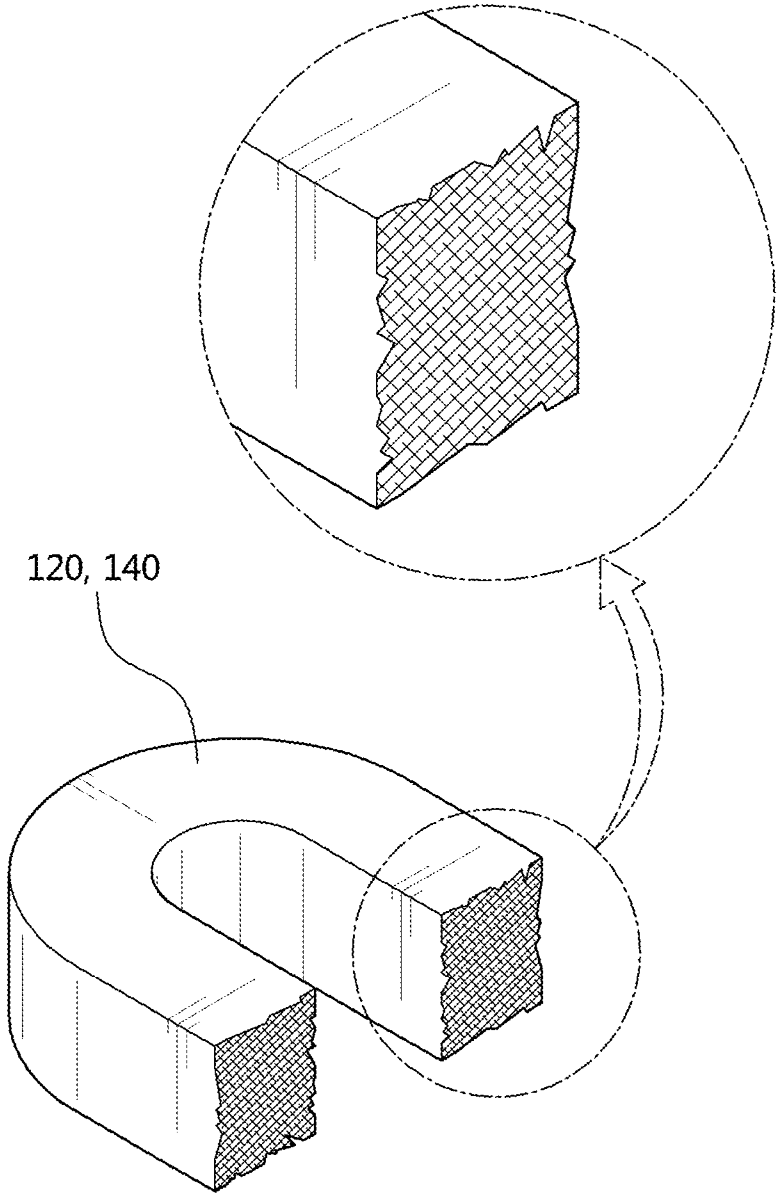

[FIG. 14]
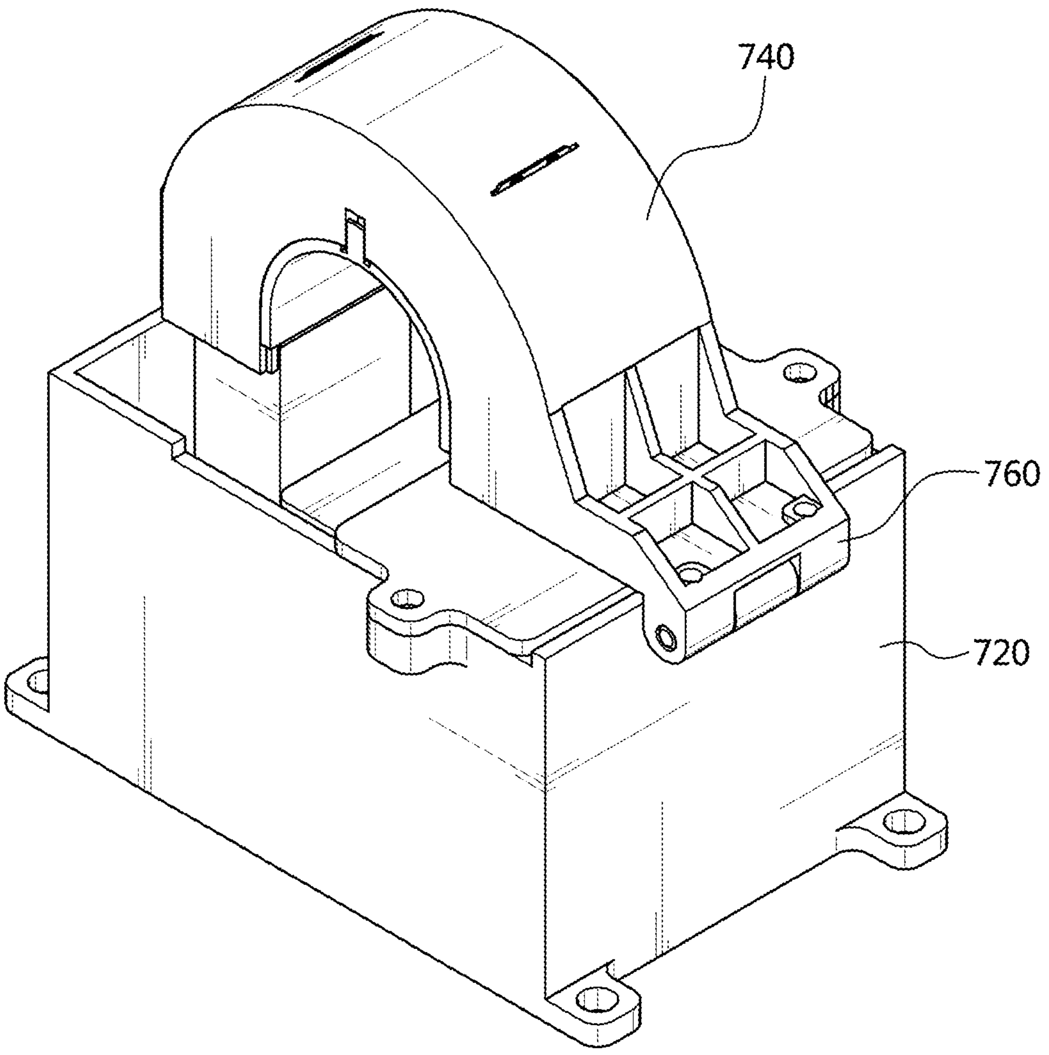

[FIG. 15]
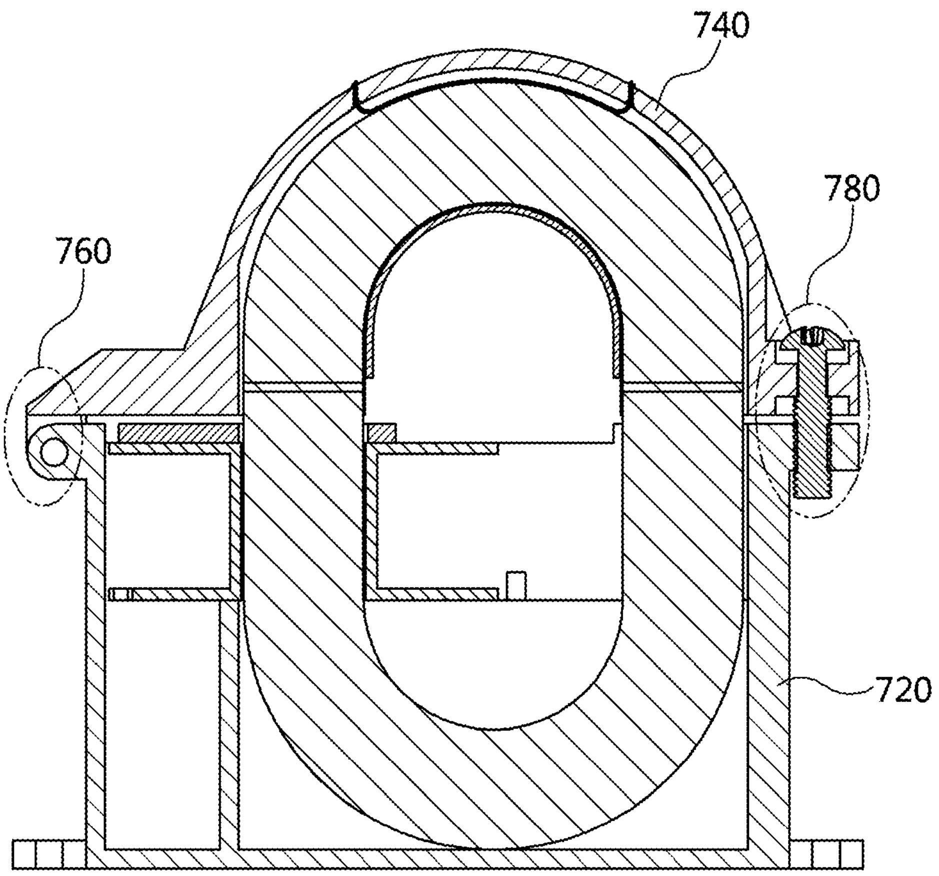

CORE FOR CURRENT TRANSFORMER

CROSS-REFERENCE TO RELATED APPLICATIONS

This application is a National Stage of International patent application PCT/KR2017/008443, filed on Aug. 4, 2017, which claims priority to foreign Korean patent application No. 10-2016-0100170 filed on Aug. 5, 2016, the disclosures of which are incorporated by reference in their entirety.

FIELD OF THE INVENTION

The present disclosure relates to a core for a current transformer, and more particularly, to a core mounted on a current transformer installed in a transmission line or a distribution line for power acquisition and current sensing using a magnetic induction phenomenon.

BACKGROUND

Recently, various types of magnetic induction power supply devices have been developed as the interest in a power supply method using a magnetic induction phenomenon is increasing.

The magnetic induction type power supply device includes a current transformer installed in a power line through which a large-capacity current flows, such as a transmission line, a distribution line, and the like. The magnetic induction type power supply device converts the power obtained by the magnetic induction phenomenon in the current transformer into DC to supply it to the load.

At this time, the current transformer is configured to include a core that surrounds the power line and a coil wound around the core for power acquisition through the magnetic induction phenomenon.

For example, referring to FIG. 1, the conventional core for the current transformer 10 has an upper core 12 and a lower core 14 formed in the same shape. At this time, there is a problem in that since the upper core 12 and the lower core 14 are formed with bent portions having an angle of about 90 degrees, the stress region on a magnetic path is generated, thereby reducing the permeability.

In addition, the conventional core for the current transformer 10 has a problem in that the inductance reduces due to the reduction in the permeability, thereby reducing the power acquisition efficiency when it is mounted on the current transformer.

Meanwhile, referring to FIG. 2, the conventional core for the current transformer 10 is configured to include the upper core 12 and the lower core 14 in a semi-cylindrical shape. At this time, since the conventional core for the current transformer 10 directly winds a coil 20 around one of the upper core 12 and the lower core 14, the number of turns of the coil 20 reduces, thereby reducing the inductance.

In addition, the conventional core for the current transformer 10 has a problem in that the power acquisition efficiency is reduced when it is mounted on the current transformer due to the reduction in the inductance.

SUMMARY OF THE INVENTION

The present disclosure is intended to solve the problems, and an object of the present disclosure is to provide a core for a current transformer, which forms the upper core in a round shape, and is disposed at a position lower than the center of the power line in which both ends of the upper core are received, thereby minimizing the stress of the magnetic path and enhancing the magnetic induction efficiency by increasing the permeability.

For achieving the object, a core for a current transformer according to an embodiment of the present disclosure includes an upper core curved in a semi-circular shape to have a receiving groove formed therein, and having both ends extended downwards to be disposed to be spaced apart from each other, and a lower core disposed on the lower portion of the upper core, and having both ends extended upwards to be disposed to face both ends of the upper core.

The upper core includes an upper base curved in a semi-circular shape; a first upper extension portion extended in a straight-line shape in the direction of the lower core from the upper base; and a second upper extension portion spaced apart from the first upper extension portion, and extended in a straight-line shape in the direction of the lower core from the upper base.

The upper base may have an upper receiving groove in a semi-cylindrical shape formed on the lower end thereof and a lower receiving groove in a hexahedral shape may be formed between the first upper extension portion and the second upper extension portion. At this time, the first upper extension portion and the second upper extension portion may be disposed in parallel with each other.

Both ends of the upper core may be disposed at a position lower than the center of a power line received in the receiving groove, and the receiving groove may receive all the cross sections of the power line.

The lower core may include a lower base; a first lower extension portion extended in the direction of the upper core from the lower base; and a second lower extension portion spaced apart from the first lower extension portion, and extended in the direction of the upper core from the lower base.

The lower base may be curved in a semi-circular shape, or may be formed in a hexahedral shape. At this time, the first lower extension portion may be formed to extend from one side portion of the lower base in the direction of the upper core, the second lower extension portion may be formed to extend from the other side portion of the lower base in the direction of the upper core, and the first lower extension portion and the second lower extension portion may be disposed in parallel with each other.

According to the present disclosure, it is possible to form the extended portions at both ends of the base in a round shape, thereby reducing the stress region of the magnetic path as compared with the conventional cores for the current transformer.

In addition, it is possible to minimize the stress region of the magnetic path instead of reducing the volume as compared with the conventional cores for the current transformer, thereby increasing the inductance and the permeability equal to or greater than those of the conventional core for the current transformer.

In addition, it is possible to increase the inductance and the permeability as compared with the conventional core for the current transformer, thereby increasing the power acquisition efficiency when it is installed in the current transformer.

In addition, it is possible to increase the magnetic path length as compared with the conventional core for the current transformer to increase the permeability, thereby increasing the power acquisition efficiency when it is installed in the current transformer.

In addition, it is possible to form the receiving groove in a round shape in the upper core so that the power line is received adjacent to the outer circumference of the receiving groove, thereby forming the power line to be relatively small in size as compared with the conventional core for the current transformer spaced apart from the outer circumference of the receiving groove.

In addition, it is possible to constitute the lower core greater than the conventional core for the current transformer when it is manufactured to have the same size as that of the conventional core for the current transformer, thereby increasing the size of the mountable bobbin, and increasing the number of turnable turns of the bobbin.

In addition, it is possible to increase the size of mountable bobbin and increase the number of turnable turns, thereby increasing the inductance as compared with the conventional core for the current transformer to increase the power acquisition efficiency when it is installed in the current transformer.

BRIEF DESCRIPTION OF THE DRAWINGS

FIGS. 1 and 2 are diagrams for explaining the conventional core for the current transformer.

FIG. 3 is a diagram for explaining a core for a current transformer according to an embodiment of the present disclosure.

FIG. 4 is a diagram for explaining an upper core of FIG. 3.

FIGS. 5 and 6 are diagrams for explaining a lower core of FIG. 3.

FIGS. 7 to 9 are diagrams for explaining by comparing the core for the current transformer according to an embodiment of the present disclosure with the conventional core for the current transformer.

FIGS. 10 to 13 are diagrams for explaining a method for manufacturing the core for the current transformer according to an embodiment of the present disclosure.

FIGS. 14 and 15 are diagrams for explaining the current transformer in which the core for the current transformer according to an embodiment of the present disclosure is installed.

DETAILED DESCRIPTION

Hereinafter, the most preferred embodiment of the present disclosure will be described with reference to the accompanying drawings so that those skilled in the art to which the present disclosure pertains may easily practice the technical spirit of the present disclosure. First, in adding reference numerals to the components in each drawing, it is to be noted that the same components are denoted by the same reference numerals even though they are illustrated in different drawings. In addition, in the following description of the present disclosure, a detailed description of relevant known configurations or functions will be omitted when it is determined to obscure the subject matter of the present disclosure.

Referring to FIG. 3, a core for a current transformer 100 is configured to include an upper core 120 in which a power line 200 is received and a lower core 140 in which a bobbin 300, around which a coil 320 is wound, is installed.

The upper core 120 is disposed on the upper portion of the lower core 140, and has a receiving groove 124 in which the power line 200 is received formed therein. At this time, the upper core 120 is curved in a semicircular shape at the center thereof, and is formed in a shape surrounding a part of the circumference of an electric wire (e.g., ∩ shape). Therefore, the upper core 120 minimizes the spacing between the power line 200 and the core.

At this time, when the power line 200 is received in the receiving groove 124 of the upper core 120, both ends of the upper core 120 are disposed at a position lower than the center of the power line 200 (i.e., a position further adjacent to the lower core 140). Therefore, the power line 200 is fully received in the receiving groove 124 formed in the upper core 120.

For example, referring to FIG. 4, the upper core 120 is configured to include an upper base 121, a first upper extension portion 122, and a second upper extension portion 123. Hereinafter, although it has been described by separating the upper core 120 into the upper base 121 to the second upper extension 123 in order to easily explain the shape of the upper core 120, the upper core 120 is integrally formed.

The upper base 121 is formed in a semi-cylindrical shape. The cross section of the upper base 121 may be formed in a rectangular shape. The upper base 121 has an upper receiving groove 125 in a semi-cylindrical shape in which the power line 200 is received formed therein. That is, the upper base 121 is curved in a semicircular shape to form the upper receiving groove 125 in a semi-cylindrical shape. At this time, the upper receiving groove 125 receives a part of the power line 200 (i.e., a part of the cross section of the power line 200).

The first upper extension portion 122 is formed to extend from one end of the upper base 121 downwards (i.e., toward the lower core 140). At this time, the first upper extension portion 122 is formed to extend in a straight-line shape. The first upper extension portion 122 may be formed in a hexahedral shape whose cross section is formed in the same shape as the cross section of the upper base 121.

The second upper extension portion 123 is formed to extend from the other end of the upper base 121 downwards (i.e., toward the lower core 140). At this time, the second upper extension portion 123 is formed to extend in a straight-line shape. The second upper extension portion 123 may be formed in a hexahedral shape whose cross section is formed in the same shape as the cross section of the upper base 121. Herein, the second upper extension portion 123 may be disposed in parallel with the first upper extension portion 122.

Meanwhile, as the first upper extension portion 122 and the second upper extension portion 123 extend from both ends of the upper base 121 to be spaced apart from each other, a lower receiving groove 126 in a predetermined shape (e.g., a rectangular parallelepiped shape) is formed between the first upper extension portion 122 and the second upper extension portion 123. At this time, the lower receiving groove 126 receives the remaining portion of the power line 200 excluding the portion received in the upper receiving groove 125.

Therefore, the upper core 120 has the receiving groove 124 having a structure in which the groove in a rectangular parallelepiped shape is coupled to the lower portion of the groove in a semi-cylindrical shape formed on the upper portion thereof. At this time, half of the power line 200 may be received in the upper portion of the receiving groove 124 (i.e., the groove in a semi-cylindrical shape) with respect to the cross section thereof, and the other half of the power line 200 may be received in the lower portion thereof (i.e., the groove in a rectangular parallelepiped shape).

The lower core 140 is disposed at the lower portion of the upper core 120, and has both ends in contact with both ends of the upper core 120. The lower core 140 is formed in a shape of rotating the upper core 120 by 180 degrees (e.g., U shape). At this time, a bobbin 300 having a coil 320 wound around at least one end of both ends of the lower core 140 is mounted. Herein, the bobbin 300 is mounted on the lower core 140 as one end of the lower core 140 passes through the groove formed in the bobbin 300.

For example, referring to FIG. 5, the lower core 140 is configured to include a lower base 142, a first lower extension portion 144, and a second lower extension portion 146. Hereinafter, although it has been described by separating the lower core 140 into the lower base 142 to the second lower extension portion 146 in order to easily explain the shape of the lower core 140, the lower core 140 is integrally formed.

The lower base 142 is formed in a semi-cylindrical shape. At this time, the cross section of the lower base 142 may be formed in a rectangular shape. That is, the lower base 142 is curved in a semicircular shape to be formed in a semi-cylindrical shape.

The first lower extension portion 144 is formed to extend from one end of the lower base 142 upwards (i.e., toward the upper core 120). At this time, the first lower extension portion 144 may be formed in a hexahedral shape whose cross section is formed in the same shape as the cross section of the lower base 142. The cross section of the first lower extension portion 144 may be formed in the same shape as the cross section of the upper core 120.

The second lower extension portion 146 is formed to extend from the other end of the lower base 142 upwards (i.e., toward the upper core 120). At this time, the second lower extension portion 146 may be formed in a hexahedral shape whose cross section is formed in the same shape as the cross section of the lower base 142. The cross section of the second lower extension portion 146 may be formed in the same shape as the cross section of the upper core 120. Herein, the second lower extension portion 146 may be disposed in parallel with the first lower extension portion 144.

As illustrated in FIG. 5, when the core for the current transformer 100 mounts the bobbin 300 on the lower core 140 formed in a U shape, the spacing is generated between the lower core 140 and the bobbin 300, thereby reducing an adhesion rate between the lower core 140 and the bobbin 300.

In addition, since the core for the current transformer 100 may not mount the bobbin 300 on the round portion (i.e., the lower base 142) when mounting the bobbin 300 on the lower core 140 formed in a U shape, the size of the bobbin 300 that may be mounted on the lower core 140 is reduced, and the number of turns of the coil 320 is reduced due to the reduction in the size of the bobbin 300.

Therefore, the inductance of the core for the current transformer 100 reduces, thereby reducing the output voltage (i.e., the voltage obtained from the power line 200).

Therefore, the lower core 140 may form the core disposed on the lower portion thereof (i.e., the lower base 142) in a hexahedral shape so that the direction of the lower portion thereof may be formed in a straight-line shape. That is, the core for the current transformer 100 may form the lower portion of the lower core 140 in a straight-line shape, thereby increasing the size of the bobbin 300 that may be mounted on the lower core 140, and increasing the number of turns of the coil 320 due to the increase in the size of the bobbin 300.

Therefore, the inductance of the core for the current transformer 100 increases, thereby increasing the output voltage (i.e. the voltage obtained from the power line 200).

For example, referring to FIG. 6, the lower core 140 may include the lower base 142 to the second lower extension portion 146, and may be formed in a '⊏' shape.

The lower base 142 is formed in a rectangular parallelepiped shape. At this time, the first lower extension portion 144 and the second lower extension portion 146 may be formed at both ends of the lower base 142, or the first lower extension portion 144 and the second lower extension portion 146 may be formed at both ends of one surface thereof.

The first lower extension portion 144 is formed to extend from one end of one surface of the lower base 142 upwards (i.e., toward the upper core 120). The first lower extension portion 144 may also be formed to extend from one end portion of the lower base 142. At this time, the first lower extension portion 144 is formed in a hexahedral shape whose cross section is formed in the same shape as the cross section of one end of the upper core 120.

The first lower extension portion 144 is formed in a hexahedral shape. The first lower extension portion 144 has one end coupled to one end of the lower base 142 or has one end portion of one surface coupled to one end of the lower base 142 or one end portion of one surface thereof. The first lower extension portion 144 has the other end (i.e., one end disposed upwards) in contact with one end of the upper core 120.

The second lower extension portion 146 is formed to extend from the other end portion of one surface of the lower base 142 upwards (i.e., toward the upper core 120). The second lower extension portion 146 may also be formed to extend from the other end portion of the lower base 142 upwards. At this time, the second lower extension portion 146 is formed in a hexahedral shape whose cross section is formed in the same shape as the cross section of the other end of the upper core 120.

The second lower extension portion 146 is formed in a hexahedral shape. The second lower extension portion 146 has one end coupled to the other end of the lower base 142 or the other end portion of one surface thereof, or has one end portion of one surface thereof coupled to the other end of the lower base 142 or the other end portion of one surface thereof. The second lower extension portion 146 has the other end (i.e., one end disposed upwards) in contact with the other end of the upper core 120.

As described above, the core for the current transformer 100 forms the core (i.e., the lower base 142) disposed at the lower portion of the lower core 140 in a hexahedral shape so that the lower portion of the lower core 140 is formed in a straight-line shape, thereby increasing the size of the bobbin 300 that is mountable on the lower core 140 as compared with the core for the current transformer 100 having the lower portion of the lower core 140 formed in a round shape, and increasing the number of turns of the coil 320 due to the increase in the size of the bobbin 300.

Therefore, the inductance of the core for the current transformer 100 increases, thereby increasing the output voltage (i.e., the voltage obtained from the power line 200).

Referring to FIG. 7, the core for the current transformer 100 according to an embodiment of the present disclosure has a volume smaller than that of the conventional core for the current transformer 100. At this time, since the inductance of the core is proportional to the volume, the core for the current transformer 100 according to an embodiment of the present disclosure has the inductance smaller than the conventional core for the current transformer 100.

However, in the conventional core for the current transformer 100, the upper core 120 is bent to generate the stress region 400 of the magnetic path, thereby reducing the permeability.

In contrast, in the core for the current transformer 100 according to an embodiment of the present disclosure, the upper core 120 is formed in a round shape, thereby reducing the stress region 400 of the magnetic path as compared with the conventional core for the current transformer 100.

At this time, since the increase in the stress region 400 of the magnetic core causes the inductance and the permeability of the core to be reduced, the core for the current transformer 100 according to an embodiment of the present disclosure has a reduced volume but minimizes the stress region 400 of the magnetic path, thereby increasing the inductance and the permeability equal to or greater than the conventional core for the current transformer 100.

In addition, the inductor and the permeability of the core for the current transformer 100 according to an embodiment of the present disclosure are increased as compared with the conventional core for the current transformer 100, thereby increasing the power acquisition efficiency when it is installed in the current transformer.

Referring to FIG. 8, when the size, the permeability, and the number of turns is the same, the core for the current transformer 100 according to an embodiment of the present disclosure has the increased magnetic path length 500 as compared with the conventional core for the current transformer 100.

That is, the upper core 120 has the upper core 120 formed in a round shape, thereby reducing the inner diameter and the outer diameter thereof as compared with the conventional core for the current transformer 100 when they are manufactured in the same size. At this time, as in Equation 1, the magnetic path length 500 applies the inner diameter and the outer diameter of the core as a factor, thereby increasing the magnetic path length 500 when the inner diameter and the outer diameter reduce.

$$le = \frac{\pi(OD - ID)}{\ln\left(\frac{OD}{ID}\right)} \qquad \text{Equation 1}$$

Herein, le is the magnetic path length, OD is the outer diameter, and ID is the inner diameter.

Meanwhile, the permeability of the core is expressed by the following Equation 2. At this time, the magnetic field 500 is disposed in the numerator of the permeability formula, such that the permeability 500 increases as the magnetic path length 500 increases.

$$\mu_i = \frac{L \times le}{\mu_0 \times N^2 \times Ae} \qquad \text{Equation 2}$$

Herein, $\mu_i$ is the permeability, L is the inductance, le is the magnetic path length, $\mu_0$ is the vacuum permeability, N is the number of turns of the coil and Ae is the cross sectional area of the core.

At this time, in the core for the current transformer 100 according to an embodiment of the present disclosure, the permeability is increased by about 20% to 32% as compared with the conventional core for the current transformer 100 in the same environment (the size, the permeability of the core itself, the number of turns, and the like).

Therefore, the core for the current transformer 100 according to an embodiment of the present disclosure has the increased permeability as compared with the conventional core for the current transformer 100, thereby increasing the power acquisition efficiency when it is installed in the current transformer.

Referring to FIG. 9, the core for the current transformer 100 according to an embodiment of the present disclosure has the receiving groove 124 in a round shape formed in the upper core 120, and the conventional core for the current transformer 100 has the receiving groove 124 in a rectangular shape in the upper core 120.

At this time, in the core for the current transformer 100 according to an embodiment of the present disclosure, the power line 200 is received adjacent to the outer circumference of the receiving groove 124, while the conventional core for the current transformer 100 has the power line 200 received spaced apart from the outer circumference of the receiving groove 124.

Therefore, the core for the current transformer 100 according to an embodiment of the present disclosure may be formed in a relatively small size as compared with the conventional core for the current transformer 100. That is, the core for the current transformer 100 according to an embodiment of the present disclosure has the power line 200 received by closely contacting with the receiving groove 124 in a round shape, thereby minimizing the length of the side portion thereof to be formed in a relatively small size as compared with the conventional core for the current transformer 100.

Therefore, the core for the current transformer 100 according to an embodiment of the present disclosure may be composed of the lower core 140, which is relatively large as compared with the conventional core for the current transformer 100 when they are manufactured in the same size.

The core for the current transformer 100 according to an embodiment of the present disclosure largely forms the size of the lower core 140 as compared with the conventional core for the current transformer 100, thereby increasing the size of the mountable bobbin 300 to increase the number of turnable turns.

In addition, the core for the current transformer 100 according to an embodiment of the present disclosure increases the inductance as compared with the conventional core for the current transformer 100 as the number of turnable turns increases.

In addition, the core for the current transformer 100 according to an embodiment of the present disclosure increases the power acquisition efficiency as compared with the conventional core for the current transformer 100 when it is mounted on the current transformer as the inductance increases.

Referring to FIG. 10, the core for the current transformer 100 according to an embodiment of the present disclosure is manufactured through the steps of winding a metal ribbon S100, inserting a mold S200, heat treating S300, impregnating S400, cutting S500, and processing a surface S600. Hereinafter, a method for manufacturing the upper core 120 and the lower core 140 having a structure in which an extension portion is formed in a core base 600 in a semi-cylindrical shape will be described as an example.

The winding the metal ribbon S100 winds a metal ribbon having a predetermined thickness and width. For example, the winding the metal ribbon S100 disposes two rollers to be spaced apart from each other, and winds the metal ribbon through the two rollers to manufacture the core base 600.

That is, the winding the metal ribbon S100 manufactures the core base 600 through a rolling method.

Therefore, as illustrated in FIG. 11, the winding the metal ribbon S100 manufactures the core base 600 in a rectangular parallelepiped shape having both ends formed in a semi-cylindrical shape. At this time, the receiving groove 124 in a rectangular parallelepiped shape having both ends formed in a semi-cylindrical shape is formed inside the core.

Of course, the winding the metal ribbon S100 also winds the metal ribbon on the mold in a rectangular parallelepiped shape having both ends formed in a semi-cylindrical shape to manufacture the core base 600.

The permeability of the core is reduced when an air gap is formed between the metal ribbons when the metal ribbon is wound in the winding the metal ribbon S100.

Therefore, the winding the metal ribbon S100 winds the metal ribbon through the rolling to minimize the formation of the air gaps between the metal ribbons to prevent the permeability from being reduced, thereby preventing the characteristics of the core from being reduced.

The inserting the mold S200 inserts the core base 600 manufactured in the winding the metal ribbon S100 into the mold. Therefore, the core base 600 is prevented from being deformed during heat treatment and impregnation of the base core.

The heat treating S300 heat-treats the core base 600 manufactured in the winding the metal ribbon S100. That is, the heat treating S300 applies heat to the core base 600 so that the density of the core base 600 becomes uniform and the saturation induction characteristic is kept constant.

The impregnating S400 impregnates the impregnation fluid into the heat-treated core base 600. That is, the impregnating S400 impregnates the impregnation fluid (e.g., varnish impregnation fluid) into the core base 600, thereby minimizing the air gap of the core base 600.

At this time, although it has been described that the impregnating S400 is performed after the heat treating S300, the heat treating S300 may also be performed after the impregnating S400. Herein, since the heat treating S300 and the impregnating S400 are processed through the conditions used in a general method for manufacturing the core, a detailed description thereof will be omitted.

As illustrated in FIG. 12, the cutting S500 cuts the heat-treated and impregnated core base 600 to manufacture the upper core 120 and the lower core 140. That is, the cutting S500 cuts the core base 600 in a direction perpendicular to the winding direction. At this time, the cutting S500 may cut the center of the core base 600 to manufacture the upper core 120 and the lower core 140 having the same size, or may cut the position shifted to one end of the core base 600 to manufacture the upper core 120 and the lower core 140 having different sizes from each other.

The processing the surface S600 processes both ends (i.e., cut surfaces) of the upper core 120 and the lower core 140 manufactured in the cutting S500.

As illustrated in FIG. 13, the cut surfaces of the upper core 120 and the lower core 140 cut in the cutting S500 are formed so that their surfaces are rough. Therefore, a gap may be generated when the upper core 120 and the lower core 140 cut in the cutting S500 are coupled.

At this time, when it is mounted in the current transformer in a state where the gap has been generated, the voltage acquisition efficiency is reduced by the gap generated between the cut surfaces when the upper core 120 and the lower core 140 are coupled.

Therefore, the processing the surface S600 performs surface processing so that both end surfaces (i.e., cut surfaces) of the upper core 120 and the lower core 140 become the same. At this time, the processing the surface S600 may process both cross sections of the upper core 120 and the lower core 140 through polishing.

Meanwhile, when the lower core 140 is composed of the lower base 142 in a rectangular parallelepiped shape and the extension portions, the first core base 600 having the receiving groove 124 in a rectangular parallelepiped shape formed inside the rectangular parallelepiped shape through the winding the metal ribbon S100 and the above-described second core base 600 (see FIG. 11) are manufactured, respectively.

Then, the first core base 600 and the second core base 600 are each processed and then cut S500 through the inserting the mold S200, the heat treating S300, and the impregnating S400 for each of the first core base 600 and the second core base 600.

Then, after the processing the surface S600 is performed on the cut core, one core cut in the first core base 600 is used as the lower core 140, and one core cut in the second core base 600 is used as the upper core 120 to manufacture the core for the current transformer 100.

Referring to FIGS. 14 and 15, a current transformer 700 is configured to include a main body housing 720 on which the lower core 140 is mounted, and a core housing 740 on which the upper core 120 is mounted.

A hinge member 760 is formed at one side of the main body housing 720 and the core housing 740 in order to easily receive a cable, and a fastening member 780 (e.g., groove formed with a thread) is formed at the other side thereof in order to easily align and fasten the upper core 120 and the lower core 140.

The main body housing 720 may have the lower surface formed in a planar shape in order to fix the current transformer 700, thereby occurring the waste of the mounting space, and reducing the alignment accuracy with the upper core 120 by detaching (moving) the lower core 140 by an external impact when the lower core 140 is formed in a round shape.

At this time, when the alignment accuracy between the upper core 120 and the lower core 140 is reduced, the power acquisition efficiency of the current transformer 700 is reduced.

Therefore, the lower core 140 formed in a planar shape may further enhance the power acquisition efficiency than the lower core 140 formed in a round shape.

In addition, when the lower core 140 formed in a round shape is mounted on the current transformer 700, the waste in the mounting space may occur, while when the lower core 140 in a planar shape is mounted on the current transformer 700, the waste of the mounting space may be minimized.

In addition, when the lower core 140 is formed in a planar shape, the size of the mountable bobbin 300 increase as compared with the lower core 140 in a round shape in which the bobbin 300 may not be mounted on the round portion thereof (i.e., the lower base 142), and the number of turns of the coil 320 increase due to the increase in the size of the bobbin 300.

Therefore, the inductance of the core for the current transformer 100 increases, thereby increasing the output voltage of the current transformer 700 (i.e., the voltage obtained from the power line 200).

As described above, although preferred embodiments according to the present disclosure have been described, it is to be understood by those skilled in the art that they may be modified into various forms, and various modifications and changes thereof may be embodied by those skilled in the art without departing from the scope of the present disclosure.

The invention claimed is:

1. A core for a current transformer, comprising:

an upper core curved in a semi-circular shape to have a receiving groove formed therein, and having both ends extended downwards to be disposed to be spaced apart from each other;

a lower core disposed on a lower portion of the upper core, and having both ends extended upwards to be disposed to face the both ends of the upper core; and a bobbin in which a coil is wound and mounted on the lower core, wherein the receiving groove receives all the cross sections of a power line, wherein the lower core comprises:

a lower base;

a first lower extension portion extended in the direction of the upper core from the lower base; and a second lower extension portion spaced apart from the first lower extension portion, and extended in the direction of the upper core from the lower base, and wherein the bobbin is mounted on one of the first lower extension portion and second lower extension portion, and wherein the power line is received adjacent to an outer circumference of the receiving groove of the upper core.

2. The core for the current transformer of claim 1, wherein the upper core comprises an upper base curved in a semi-circular shape;

a first upper extension portion extended in a straight-line shape in the direction of the lower core from the upper base; and a second upper extension portion spaced apart from the first upper extension portion, and extended in a straight-line shape in the direction of the lower core from the upper base.

3. The core for the current transformer of claim 2, wherein the upper base has an upper receiving groove in a semi-cylindrical shape formed on the lower end thereof.

4. The core for the current transformer of claim 2, wherein a lower receiving groove in a hexahedral shape is formed between the first upper extension portion and the second upper extension portion.

5. The core for the current transformer of claim 2, wherein the first upper extension portion and the second upper extension portion are disposed in parallel with each other.

6. The core for the current transformer of claim 1, wherein both ends of the upper core are disposed at a position lower a center of a power line received in the receiving groove.

7. The core for the current transformer of claim 1, wherein the lower base is formed in a hexahedral shape.

8. The core for the current transformer of claim 7, wherein the first lower extension portion is formed to extend from one side portion of the lower base in the direction of the upper core, and wherein the second lower extension portion is formed to extend from the other side portion of the lower base in the direction of the upper core.

9. The core for the current transformer of claim 1, wherein the first lower extension portion and the second lower extension portion are disposed in parallel with each other.

* * * * *